United States Patent [19]

McBain et al.

[11] 4,060,978
[45] Dec. 6, 1977

[54] DRAG CHAIN

[75] Inventors: Robert T. McBain, Brush Prairie, Wash.; Bruce C. Johnson, Portland, Oreg.

[73] Assignee: Columbia Steel Casting Co. Inc., Portland, Oreg.

[21] Appl. No.: 771,555

[22] Filed: Feb. 24, 1977

[51] Int. Cl.² ............................................. F16G 13/18
[52] U.S. Cl. .......................................... 59/78; 59/84; 59/86; 59/90
[58] Field of Search .................. 59/78, 84, 86, 90, 93, 59/80, 82

[56] References Cited

U.S. PATENT DOCUMENTS

| Re. 28,746 | 3/1976 | Bruce | 59/84 |
|---|---|---|---|
| 251,464 | 12/1881 | Rogers | 59/86 |
| 618,086 | 1/1899 | Haase | 59/86 |
| 1,222,997 | 4/1917 | Rottmer | 59/86 |
| 2,259,880 | 10/1941 | Ehmann | 59/86 |
| 2,824,421 | 2/1958 | Nelson | 59/85 |
| 3,330,107 | 7/1967 | Klein | 59/86 |
| 3,817,028 | 6/1974 | Blackwood | 59/86 |

Primary Examiner—C.W. Lanham
Assistant Examiner—Gene P. Crosby
Attorney, Agent, or Firm—Owen, Wickersham & Erickson

[57] ABSTRACT

A chain particularly useful for draglines in various type strip mining operations is disclosed. The chain is made up of individual, separately assembled links of generally a U-shape having spaced pin lugs at one end. The lugs have aligned pin eyes for holding a pin between them, which is received generally flush with the outside surfaces of the lugs. To prevent pin rotation and to prevent oblong wear in the pin eyes, the pin and the eyes have a flat surface on the side toward the open end of the U-shaped link. With the pin installed in the eyes, a keeper is welded onto the flat surface of the pin, extending between the two lugs to retain the pin in place. The units are assembled at 90° to one another, with a pin of one link passing through the next link. The body of the link may be of a more wear-resistant material than the pin so that the easily replaceable pin wears out first.

14 Claims, 5 Drawing Figures

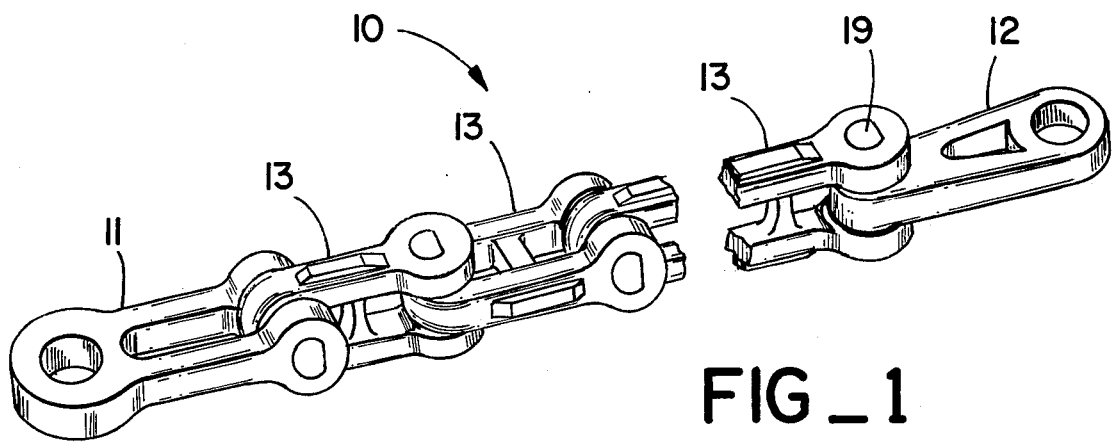
FIG_1
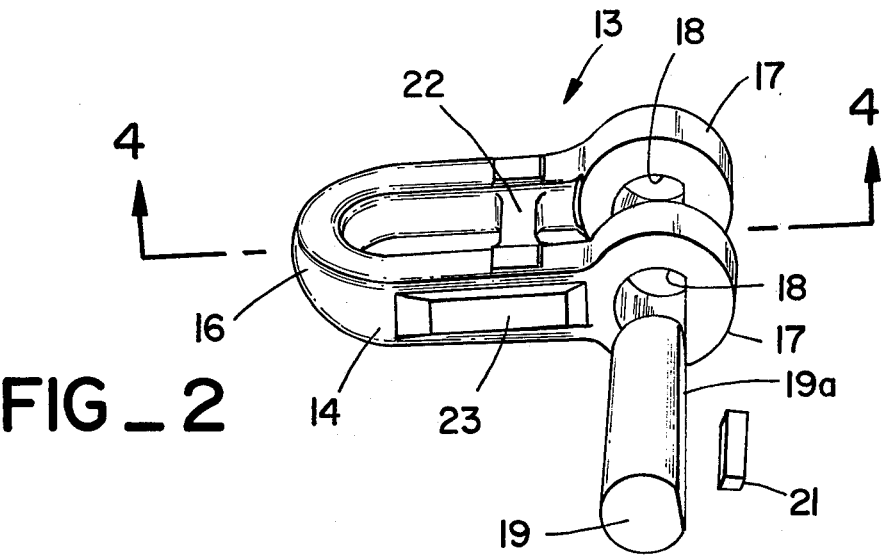
FIG_2
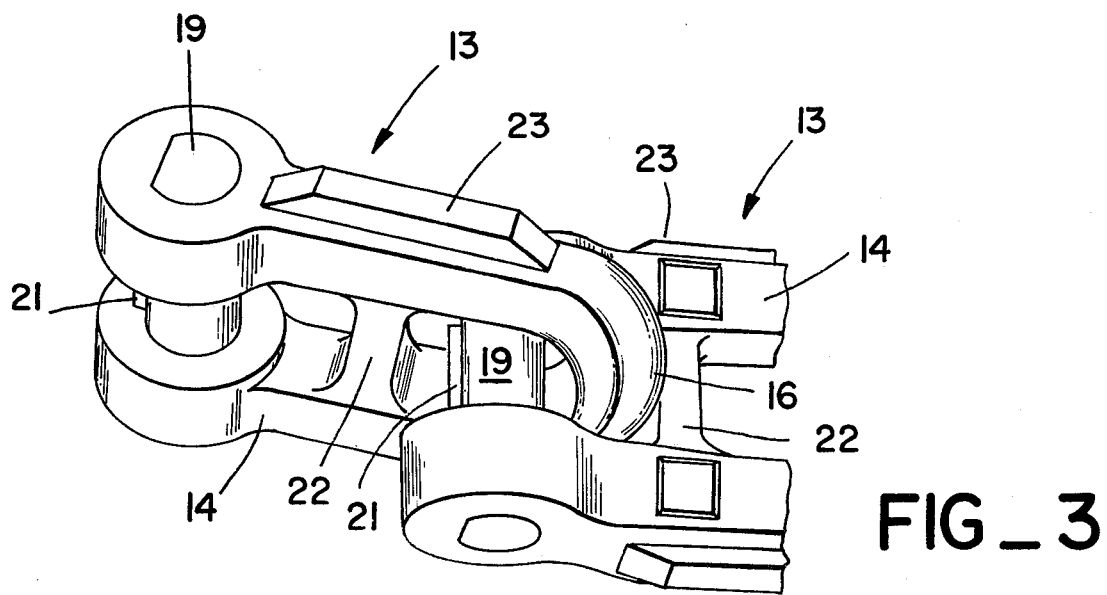
FIG_3

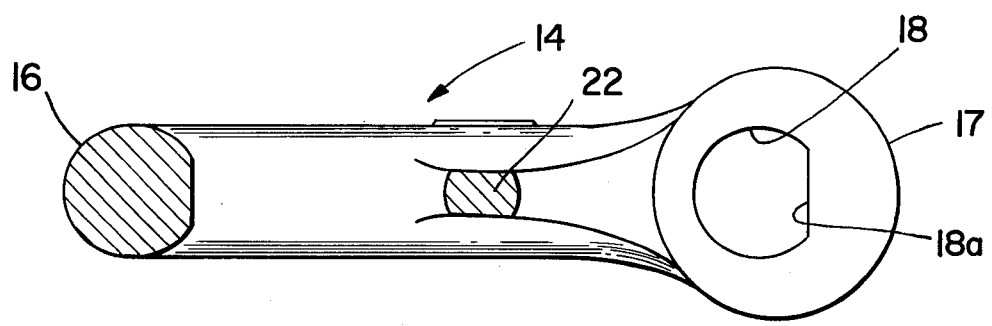
FIG_4
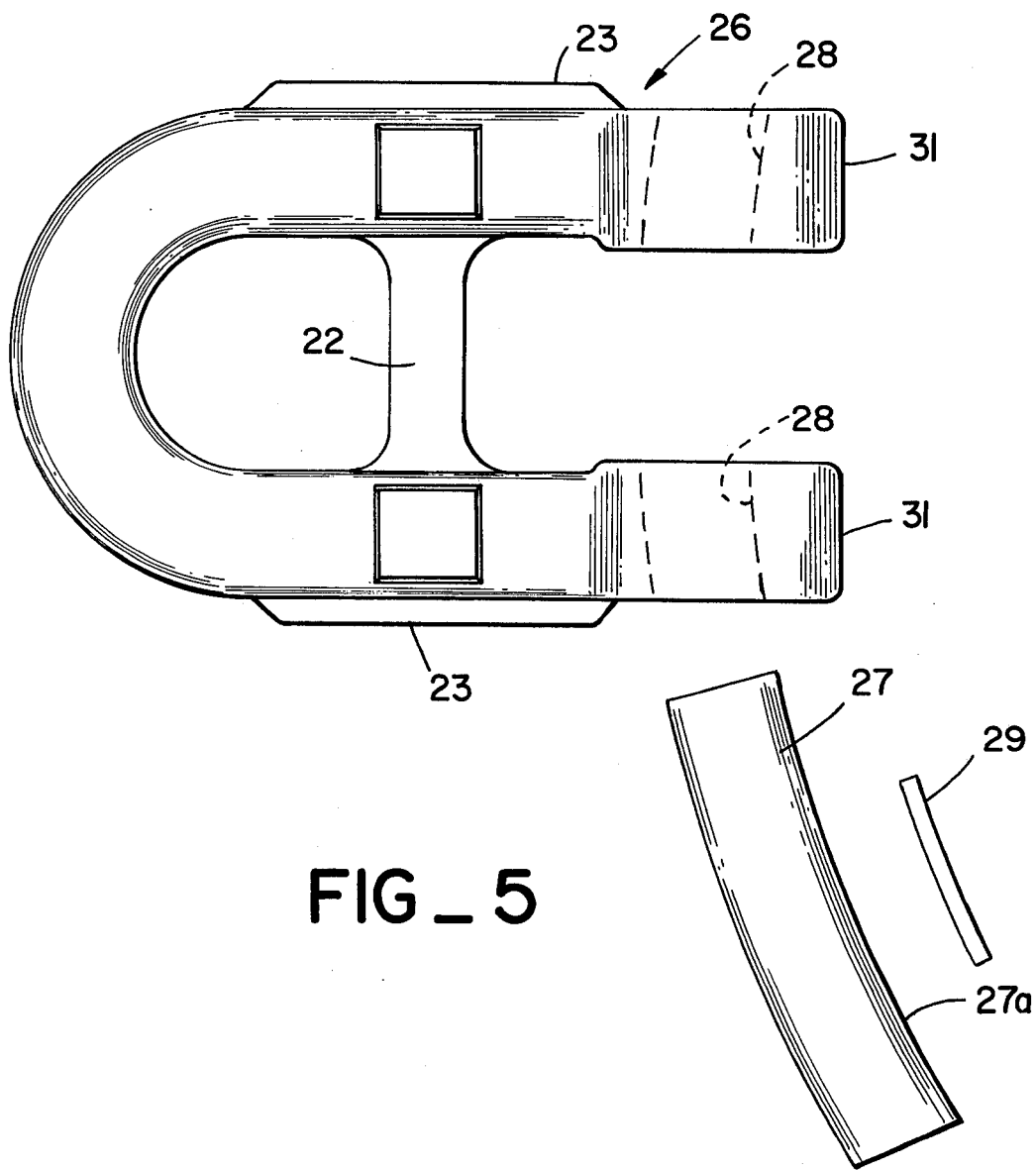
FIG_5

DRAG CHAIN

BACKGROUND OF THE INVENTION

The invention relates to chains, including the dragline type used in excavations such as strip mining. In particular, the invention relates to an improved dragline chain highly resistant to wear and including links which are separable for replacement of the link pin or the entire link.

A variety of types of dragline chains and links for such chains have been previously suggested. See, for example, U.S. Pat. Nos. 1,836,169 and 2,869,255. Other types of chains are shown in U.S. Pat. Nos. 2,824,421; 3,959,909; 1,512,609; 3,321,907 and 3,958,411.

As illustrated in the first two patents listed above, most dragline chain is formed of inter-engaged loop-like links, each of which is continuous. These chains have usually been made by placing individually cast links in a mold, placing cores around them and pouring the connecting link. This process is very costly as well as creating difficulty in cleaning, heat treating and handling, etc. Also, repair and rebuilding of such chains has been a problem in that an adjoining link can never be moved completely out of the way to weld a worn area. Repairs have often been made using a repair link which is either bolted, pinned, welded or keyed and of a different design from the remaining links, which necessitates the maintenance of additional inventory.

Some chain links of the type having non-integral pins which are assembled into the link and which sometimes may be removed, such as the links shown in the above references U.S. Pat. Nos. 1,836,169 and 3,958,411 have utilized cylindrical link pins which under many circumstances can cause an undesirable type of wear. As the pin wears to a smaller diameter, which sometimes occurs even more readily when the pin is permitted to rotate, the pin eyes tend to become egg-shaped, forming a narrow pocket at the bottom. If the pin is then replaced, the new pin is larger in diameter than the pocket areas, creating a wedging action when the chain is under tension which can quickly snap the ends of the link.

Other dismantleable type chain links, generally not used as original links in dragline chains, have tended to wear undesirably for various reasons. For example, exposed pin ends having rivet heads for maintaining the pin in place are often worn away, leaving the pin free to escape the link. Excessive wear on the sides of the main body of the link has often been a problem, also. None of the chains or chain links used or suggested heretofore has provided the highly wear-resistant, relatively inexpensive, and easily repaired chains, particularly suited for dragline purposes, as does the present invention described below.

SUMMARY OF THE INVENTION

The present invention provides a chain which solves the problems inherent in many previous types of chains, particularly those used as dragline chains, and which is economical and versatile in manufacture, maintenance and repair.

The chain of this invention is intended primarily for use with dragline buckets mainly in the coal strip mining industry. The links may be of any size, but in a drag chain they usually are very large. According to the invention, each link is cast individually and assembled by simply inserting a pin which is held in place by a keeper welded onto the pin between the two lugs which support the pin eyes. Thus, the pre-cast links may be successively assembled into a connected chain very efficiently. When repair and rebuilding of the chain is necessitated, selected pins may be removed for repair or replacement of one link at a time, with complete access to worn areas. Welding to repair worn areas is only necessary at one end of the link, since the other end is renewed by replacing the pin. Since the pin is non-rotatable and has a flat on its compression side, matched to flats in the pin eyes, undesirable oblong wear of the eyes is avoided. Replacement of a link is, of course, made with the same standard link constituting the original chain.

Another feature of the drag chain links of this invention is that the body of the link is preferably made from a dissimilar and more highly wear-resistant metal than the pin. This acts to provide for maximum wear both due to the difference in the coefficients of friction of the two metals and due to the fact that the pin may be replaced easily while the body of the link lasts much longer.

In the chain links of the invention, wear is also resisted by the protection of the pin ends by their being flush or recessed with respect to the lugs, and by the inclusion of heavy bosses on surfaces of the link body which are normally subjected to wear influences.

It is therefore among the objects of the invention to provide an improved dragline chain which is easily manufactured and assembled, and easily repaired or replaced after a period of service. These and other objects, advantages and features of the invention will become apparent from the following description of preferred embodiments, taken in conjunction with the appended drawings.

DESCRIPTION OF THE DRAWINGS

FIG. 1 is a broken perspective view showing a dragline chain according to the invention;

FIG. 2 is a perspective exploded view of a chain link of the invention;

FIG. 3 is a perspective view showing a pair of interconnected links of the drag chain;

FIG. 4 is a sectional view through a link taken generally along the line 4—4 of FIG. 2; and FIG. 5 is a plan view showing an alternative embodiment of a dragline chain link of the invention.

DESCRIPTION OF THE PREFERRED EMBODIMENTS

In the drawings, FIG. 1 shows a portion of a dragline chain 10 for use in dragging an excavation bucket, particularly in coal strip mining. The chain 10 includes a pair of end links 11 and 12, including a split horizontal end link 11 at one end. These links are of a different configuration from a series of main links 13 which extend throughout the length of the chain between the end links. As indicated, each of the main links 13 is interconnected with the next succeeding link at 90° rotation. The links of the chain may be of any desired size, depending upon the load to be pulled, but for a strip mining excavation bucket the links are generally relatively large. It should be understood, however, that the links 13 may be used in a chain for any type of service, their usefulness not being limited to a dragline chain.

FIG. 2 shows a main link 13 of the dragline chain 10 prior to assembly. The link 13 includes a yoke-shaped or generally U-shaped body 14 having a juncture end 16 and a pair of spaced lugs 17 at the opposite end, with the lugs containing a pair of aligned pin eyes 18. As indicated in the sectional view of FIG. 4, each pin eye 18 is eccentrically positioned in the circular lug so that a great deal more material is present for reinforcement at the outer end of the lug. The link bodies 14 are preferably cast from a manganese steel, affording high strength and good wear resistance.

As also seen in FIGS. 2 and 4, each pin eye 18 has a flat side 18a oriented toward the end of the link opposite the juncture end 16, i.e. oriented toward the lug end of the link. A link pin 19 shown in FIG. 2 is of a complementary shape, with a flat surface 19a, and is of a length to fit through the two pin eyes 18 of the lugs with its ends approximately flush with the outside surfaces of the lugs, as seen in FIGS. 1 and 3. This protects the ends of the pins from excessive wear during dragging.

When assembled, the pin 19 is retained in place within the pin eyes 18 by a rectangular pin keeper 21 which is affixed to the flat surface 19a of the pin, preferably by welding, and extends and fits closely between the interior sides of the two lugs 17 (see FIG. 3). The keeper may of course be of any configuration which would prevent appreciable side-to-side movement of the pin. A pair of bumps placed on the pin near the lugs would serve the purpose. The pin 19 and keeper 21 may be made of a material which is different from that of the link body 14. The pin material may be a somewhat less wear-resistant steel, for reasons of economy, since it is easily replaced when worn by removing the keeper 21. It has been found that the use of dissimilar metals for the link body and the pin can actually help maximize wear capability due to the difference in the coefficients of friction of the two metals. For example, the pin and keeper may be of a suitable type of hot rolled steel.

The link body 14 has several other important features. A strut or brace 22 extends between the two sides of the yoke-shaped body and may act in either tension or compression. Under high tension of the dragline chain 10, the link has a tendency to elongate and draw its sides together. The member 22 acts in compression to prevent or minimize this effect. Under such high tension, the member 22 may be called upon to provide a tension restraint between the two sides of the yoke. This can occur if the pin 19 deflects somewhat under load, bowing slightly outwardly and having a tendency to spread the lugs farther apart. As shown in FIGS. 2, 3, and 4, the brace member 22 narrows toward its center and is well protected against wear during dragging of the chain 10.

Also included on the link body 14 are a pair of wear-resisting bosses 23 which extend, as seen in FIGS. 2 and 3, from adjacent the pin eyes 18 along the outside surface of the link to a position short of the juncture end 16. These bosses greatly increase the wear capability of the links as they are dragged along in the chain 10. They also add further protection to the ends of the pin 19, substantially preventing them from contact with wearing surfaces.

FIG. 3 shows a pair of links 13 assembled together. The pin 19 of one link extends through an opening defined by the juncture end 16 of the link body 14, between the juncture end and the brace member 22. In the taut chain, the cylindrical surface of the pin 19 generally conforms to the curved surface of the link body against which the pin is engaged.

FIG. 5 shows an alternative embodiment of a dragline chain link according to the invention. A link 26 of FIG. 5 is similar to the links 13 described above in all respects except for the curved shape of its pin 27 and the corresponding curved pattern of the pin eyes 28. Like the pin 19, the curved pin 27 has a "flat" (but arcuately concave) lug end surface 27a, and the pin eyes 28 are shaped correspondingly. A keeper 29 to be affixed to the pin after assembly is, of course, arcuately shaped to conform to the pin. The curved pin and eye configuration of the link of FIG. 5 prevents a tendency of the link lugs 31 to spread apart under high tension in the dragline chain. This tendency, which is discussed above, can result from deflection of the pin under tension. However, with the pin and eyes arcuately shaped as shown, a small amount of deflection will not tend to spread the lugs, but rather the tension will tend to pull the lugs toward one another due to the angle at which the pin 27 presses against the pin eyes 28.

A compression brace 22 may still be included in the link 26 of FIG. 5 in order to prevent pulling together of the two sides of the link under high tension.

The above described preferred embodiments provide a dragline chain having superior links which are easily manufactured, assembled, replaced and repaired, while also exhibiting long wear capability. Various other embodiments and variations to these preferred embodiments will be apparent to those skilled in the art and may be made without departing from the spirit and scope of the following claims.

We claim:

1. A chain including a plurality of serially connected links, each link comprising a yoke shaped body having a juncture at one end defining an open area, a pair of spaced apart lugs at the other end forming an open end, each lug having a pin eye, the pin eyes being aligned with one another and each including a flat surface oriented toward said other end of the link, and a link pin shaped complementarily to the pin eyes, with a flat surface from end to end on one side and of a length to extend into both pin eyes, with a pin keeper affixed to the flat surface of the pin between the lugs when the pin is assembled in the eyes to prevent escape of the pin, said main links being interconnected with the pin of each link passing through said juncture end open area of the next succeeding link.

2. The chain of claim 1 including a brace extending between the two sides of the yoke shaped body between said juncture end and the pin, for helping prevent pulling together of the two sides under chain tension.

3. The chain of claim 1 including boss areas on the outside surface of both sides of the yoke shaped body, each extending from adjacent a pin eye along the side of the body toward the juncture end.

4. The chain of claim 1 wherein the link pin is of a length to extend into both pin eyes and substantially flush with the outside surface of each lug.

5. The chain of claim 1 wherein the yoke shaped body of the link is of a more highly wear-resistant material than the pin.

6. The chain of claim 1 wherein the pin and the link body are of dissimilar metals having different coefficients of friction.

7. The chain of claim 1 wherein the keeper is a rectangular block of a length closely fitting between the lugs, welded onto the flat side of the pin.

8. The chain of claim 1 wherein the pin is arcuately shaped with the flat side concave, and the pin eyes in the lugs are complementarily arcuately shaped, to prevent a tendency of the lugs to spread apart under chain tension.

9. A dragline chain, including a pair of opposite end links and a plurality of serially connected main links between the end links, each link comprising a yoke shaped body having a juncture at one end defining an open area, a pair of spaced apart lugs at the other end, each having a pin eye, the pin eyes being aligned with one another and each including a flat surface oriented toward said other end of the link, and a link pin shaped complementarily to the pin eyes, with a flat surface from end to end on one side and of a length to extend between the pin eyes without projecting beyond the outside boundary of either pin eye, with a pin keeper affixed to the flat surface of the pin between the lugs when the pin is assembled in the eyes to prevent escape of the pin, said main links being interconnected with the pin of each link passing through said juncture end opening of the next succeeding link.

10. The dragline chain of claim 1 including boss areas on the outside surfaces of both sides of the yoke shaped body, each extending from adjacent a pin eye along the side of the body toward the juncture end.

11. The dragline chain of claim 1 wherein the yoke shaped body of the link is of a more highly wear-resistant material than the pin.

12. The dragline chain of claim 1 wherein the pin and the link body are of dissimilar metals having different coefficients of friction.

13. The dragline chain of claim 1 wherein the pin is arcuately shaped with the flat side concave, and the pin eyes in the lugs are complementarily arcuately shaped, to prevent a tendency of the lugs to spread apart under chain tension.

14. A dragline chain including a pair of opposite end links and a plurality of serially connected main links between the end links, each link comprising a yoke shaped body having a juncture at one end defining an open area, a pair of spaced apart lugs at the other end, a brace extending between the two sides of the yoke shaped body between said juncture end and the other end, boss areas on the outside surfaces of both sides of the yoke shaped body, each extending from adjacent a pin eye along the side of the body toward the juncture end, each lug having a pin eye, the pin eyes being aligned with one another and each including a flat surface oriented toward said other end of the link, and a link pin shaped complementarily to the pin eyes, with a flat surface from end to end on one side and of a length to extend between the pin eyes without projecting beyond the outside boundary of either pin eye, with a pin keeper affixed to the flat surface of the pin between the lugs when the pin is assembled in the eyes to prevent escape of the pin, said pin and link body being of dissimilar metals having different coefficients of friction main links being interconnected with the pin of each link passing through said juncture end opening of the next succeeding link.

* * * * *

UNITED STATES PATENT AND TRADEMARK OFFICE
CERTIFICATE OF CORRECTION

PATENT NO. : 4,060,978

DATED : December 6, 1977

INVENTOR(S) : ROBERT T. McBAIN and BRUCE C. JOHNSON

It is certified that error appears in the above-identified patent and that said Letters Patent are hereby corrected as shown below:

Claims 10, 11, 12 and 13 - 1st line, rewrite "1" as --9--.

Signed and Sealed this

Twenty-third Day of May 1978

[SEAL]

Attest:

RUTH C. MASON
Attesting Officer

LUTRELLE F. PARKER
Acting Commissioner of Patents and Trademarks